United States Patent
Ozaki

(10) Patent No.: US 8,526,296 B2
(45) Date of Patent: Sep. 3, 2013

(54) SIGNAL SEPARATION DEVICE AND SIGNAL SEPARATING METHOD

(75) Inventor: Kazuyuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 13/026,205

(22) Filed: Feb. 11, 2011

(65) Prior Publication Data

US 2011/0199888 A1    Aug. 18, 2011

(30) Foreign Application Priority Data

Feb. 12, 2010 (JP) .................. 2010-29440

(51) Int. Cl.
*H04L 5/06* (2006.01)
*H04L 1/04* (2006.01)
*H04J 9/00* (2006.01)
*H04B 7/208* (2006.01)
*H04K 1/04* (2006.01)

(52) U.S. Cl.
USPC ........... 370/204; 370/208; 370/319; 370/344; 375/260; 375/267; 375/347

(58) Field of Classification Search
USPC ............... 370/201–211, 286–291, 310–350, 370/441, 479–497; 375/140–148, 254, 260, 375/267, 285, 299, 347–350
See application file for complete search history.

(56) References Cited

U.S. PATENT DOCUMENTS

| | | | | |
|---|---|---|---|---|
| 7,327,795 | B2* | 2/2008 | Oprea | 375/260 |
| 7,787,556 | B2* | 8/2010 | Zhang et al. | 375/267 |
| 7,957,484 | B2* | 6/2011 | Waters et al. | 375/267 |
| 8,320,510 | B2* | 11/2012 | Kim et al. | 375/347 |
| 8,428,173 | B2* | 4/2013 | Lin et al. | 375/267 |

FOREIGN PATENT DOCUMENTS

| | | |
|---|---|---|
| JP | 2009-55216 A | 3/2009 |
| JP | 2009-55217 A | 3/2009 |
| JP | 2009-141768 A | 6/2009 |

* cited by examiner

*Primary Examiner* — Tri H Phan
(74) *Attorney, Agent, or Firm* — Fujitsu Patent Center

(57) ABSTRACT

A signal separation device includes a column switching unit switching a column vector of a channel matrix obtained by estimating a propagation path characteristic so that a transmitted signal component of each transmit antenna is in a left end, a QR decomposition layering unit multiplying received signals by an output from the column switching unit, and outputting a received signal vector in which the received signal is layered so that a transmitted signal exists in a first row, an interference cancellation unit cancelling an interference component from a signal in the first row by using a signal other than the signal in the first row, a signal candidate point selecting unit selecting a prescribed number of signal candidate points from among signals output by the interference cancellation unit, and a signal separation unit separating the transmitted signal from the layered received signal vector using the selected signal candidate point.

15 Claims, 8 Drawing Sheets

SIGNAL SEPARATION DEVICE AND SIGNAL SEPARATING METHOD

CROSS-REFERENCE TO RELATED APPLICATIONS

This application is based upon and claims the benefit of priority from the prior Japanese Patent Application No. 2010-29440 filed on Feb. 12, 2010, the entire contents of which are incorporated herein by reference.

FIELD

The embodiments discussed herein are related to a signal separation device and a signal separating method of a radio communication system in which signals transmitted from a plurality of transmit antennas are received by a plurality of receive antennas.

BACKGROUND

In a radio communication, improvement of frequency utilization efficiency for increasing a capacity of communication by using a limited frequency source has been desired. There has been proposed a Multiple Input Multiple Output (MIMO) system as a technique for improving the frequency utilization efficiency. The MIMO system configures a space multiplex channel on substantially the same frequency band at substantially the same time by a plurality of transmit antennas and a plurality of receive antennas, and improves an information transmitted rate.

There is QR decomposition and M-algorithm (QRM-MLD) as a method for separating transmitted signals from a transmitter on a receiver side. By using the QRM-MLD, a channel matrix between the transmitter and the receiver is subjected to QR decomposition, and received signals are layered based on the result. Accordingly, an operation amount of the receiver is reduced by reducing signal candidate points if the signals without an interference signal component, that is, the signals in the last layer after being layered are sequentially used.

If three transmit antennas and three receive antennas are used, a channel matrix H is expressed as the following formula (1). In this case, elements $h_{1,1}$, $h_{2,1}$, and $h_{3,1}$ indicate characteristics for receiving a transmitted signal from a first transmit antenna by first, second, and third receive antennas, respectively.

$$H = \begin{bmatrix} h_{1,1} & h_{1,2} & h_{1,3} \\ h_{2,1} & h_{2,2} & h_{2,3} \\ h_{3,1} & h_{3,2} & h_{3,3} \end{bmatrix} \quad (1)$$

The QR decomposition of the channel matrix H may be expressed as the following formula (2).

$$H = Q \begin{bmatrix} r_{1,1} & r_{1,2} & r_{1,3} \\ 0 & r_{2,2} & r_{2,3} \\ 0 & 0 & r_{3,3} \end{bmatrix} \quad (2)$$

If each of the received signals is multiplied by a complex conjugate transposition of a unitary matrix generated by the QR decomposition and the received signals are layered in such a way that the transmitted signal component exists mainly in the first row, a received signal vector after layering $y_n$ may be expressed as the following formula (3). Here, $x_1$, $x_2$, and $x_3$ indicate transmitted signals of the first, second, and third transmit antennas, respectively.

$$y = \begin{bmatrix} r_{1,1} & r_{1,2} & r_{1,3} \\ 0 & r_{2,2} & r_{2,3} \\ 0 & 0 & r_{3,3} \end{bmatrix} \begin{bmatrix} x_1 \\ x_2 \\ x_3 \end{bmatrix} + \Pi \quad (3)$$

For example, if the transmitted signals $x_1$, $x_2$, and $x_3$ are 64-QAM signals, the signal $r_{3,3} \times x_3$ in the last row where there is no interference component is compared to 64 replicas of the signal $x_3$ to select M pieces of replicas with a higher likelihood, so that the signal candidate points are reduced. After that, the signal $r_{2,2} \times x_2$ is compared to the signal $r_{2,3} \times x_3$, and 64 replicas of the signal $x_2$ are compared to the replicas of M pieces of the signal candidate points of the signal $x_3$ to select M pieces of replicas with a higher likelihood, so that the signal candidate points are reduced. Similarly, the signal $r_{1,1} \times x_1$, $r_{1,2} \times x_2$, and $r_{1,3} \times x_3$ in the first row are compared, and 64 replicas of the signal $x_1$ are compared to M pieces of the signal candidate points of the signals $x_2$ and $x_1$ respectively to select a signal candidate point with a higher likelihood.

There has been a proposal of a technique for performing the QR decomposition on a channel matrix, linear-filtering a corresponding received sequence, generating a transformation received sequence with respect to each subcarrier belonging to each group of subcarrier, and for refining candidates of a transmitted sequence in which space orders are rearranged, and outputting a final estimation result based on a candidate with the smallest likelihood metric as a temporary estimation result out of the candidates (for example, see Japanese Laid-open Patent Publication No. 2009-55216).

Moreover, there has been a proposal of a technique that a signal detection device refines the candidates of the transmitted sequence in which the space orders are rearranged based on an order of candidate signal point selection, and based on a result of the refined candidates of the transmitted sequence, outputting the candidate with the smallest likelihood metric as a temporary estimation result (for example, see Japanese Laid-open Patent Publication No. 2009-55217).

Furthermore, there has been a proposal of a technique that a received device calculates a new likelihood value as a next rank of the smallest likelihood value based on the rank of the likelihood value that corresponds to a combination of signal points, for deciding a smallest likelihood value as the smallest value among the likelihood values that include the new likelihood value and exclude the smallest likelihood value, and for selecting the combination of signal points that corresponds to the smallest likelihood values as a transmitted symbol candidate in each row (for example, see Japanese Laid-open Patent Publication No. 2009-141768).

SUMMARY

According to an aspect of the invention, a signal separation device used in a radio communication system in which a signal transmitted from a plurality of transmit antennas are received by a plurality of receive antennas includes a column switching unit which switches a column vector of a channel matrix obtained by estimating a propagation path characteristic so that a transmitted signal component of each transmit antenna is in a left end, a QR decomposition layering unit which multiplies a received signal of the plurality of receive antennas by an output from the column switching unit, and outputs a received signal vector in which the received signal is layered so that a transmitted signal exists in a first row, an interference cancellation unit which cancels an interference component from a signal in the first row in the layered received signal vector by using a signal other than the signal in the first row in a layered received signal vector, a signal candidate point selecting unit which selects a prescribed number of signal candidate points of the transmitted signal from among signals whose interference components have been cancelled, and a signal separation unit which performs signal separation of the transmitted signal from the layered received signal vector output by the QR decomposition layering unit by using the selected signal candidate point of the transmitted signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to the QRM-MLD of the related art described above, even though the signal candidate points are firstly reduced by using the signal in the last row where there is no interference component, a received diversity effect with respect to the last row where there is no interference component may not be obtained. That is, the components of the transmitted signal $x_3$ are divided into the signal $r_{3,3} \times x_3$ in the last row, the signal $r_{2,3} \times x_3$ in the middle row, and the signal $r_{1,3} \times x_3$ in the first row. Since the received diversity effect may not be obtained, the signal points may not be considerably reduced in an initial row (a row where the signal candidate points in the last row are reduced) of the QRM-MLD. This causes a problem that reduction of the operation amount may not be achieved.

Embodiments of the present invention to overcome the problem will be described below with reference to the diagrams.

[First Embodiment]

Figure 1:
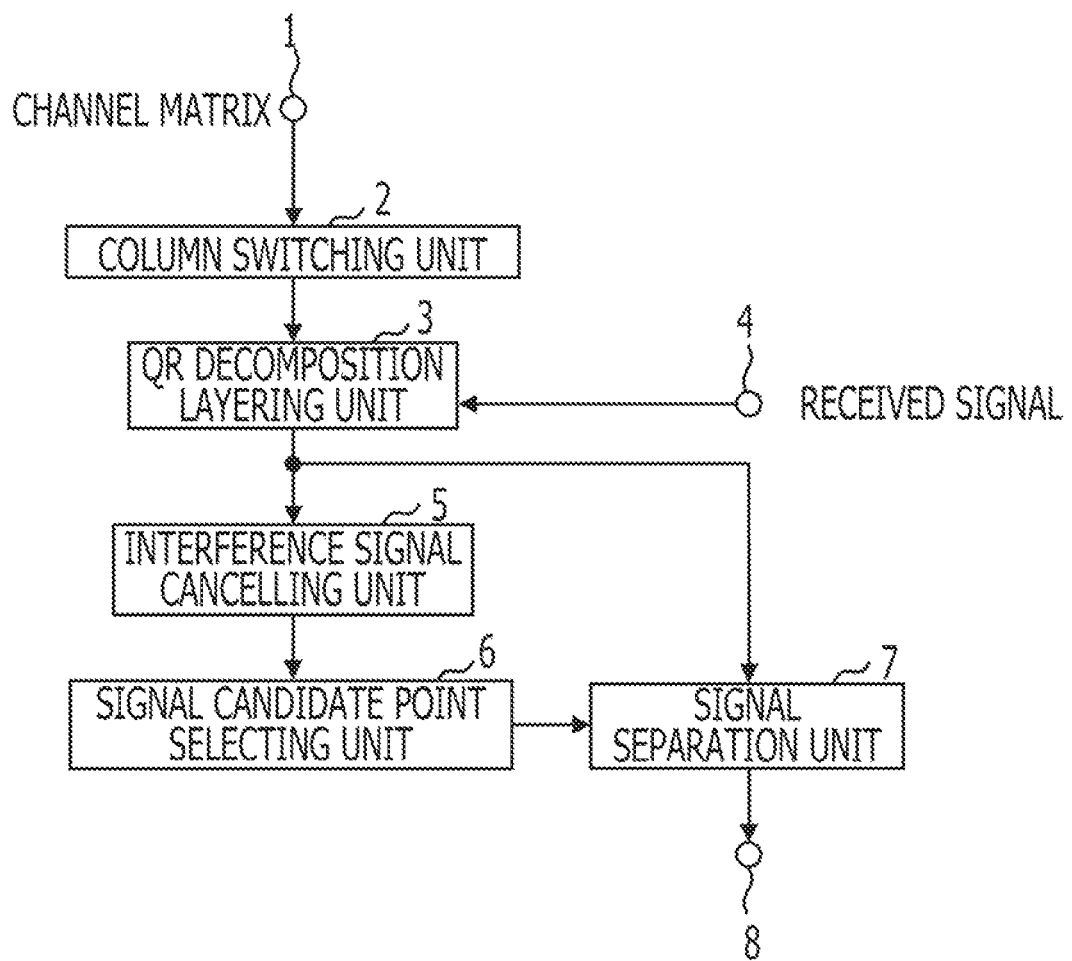
FIG. 1 is a configuration diagram of a first embodiment of a MIMO signal separation device.

FIG. 1 is a configuration diagram of a first embodiment of a Multiple Input Multiple Output (MIMO) signal separation device. In FIG. 1, a column switching unit 2 is provided with a column vector of a channel matrix, which is obtained by estimating a propagation path characteristic, from a terminal 1. The column switching unit 2 switches transmitted signal components of a transmit antenna of the channel matrix so that the transmitted signal component is positioned in a left end of the matrix, and outputs the column vector.

A QR decomposition layering unit 3 performs QR decomposition on a plurality of channel matrixes that are output from the column switching unit 2, multiplies the received signals of a plurality of receive antennas provided from a terminal 4 by a QR decomposition output, and outputs a plurality of received signal vectors in which the received signals are layered so that the transmitted signal exists in the first row.

An interference signal cancelling unit 5 cancels the interference component by using the signal other than the signal in the first row from the signal in the first row in the plurality of layered received signal vectors output from the QR decomposition layering unit 3.

A signal candidate point selecting unit 6 selects a prescribed number of signal candidate points of the transmitted signal from the signal whose interference component is cancelled output from the interference signal cancelling unit 5.

A signal separation unit 7 uses the signal candidate point of the transmitted signal selected by the signal candidate point selecting unit 6 to perform signal separation of the transmitted signal of the layered received signal vector output from the QR decomposition layering unit 3, and outputs the separated transmitted signal from a terminal 8.

The functions illustrated in the FIG. 1 including the column switching unit 2, the QR decomposition layering unit 3, the interference signal cancelling unit 5, the signal candidate point selecting unit 6, and the signal separation unit 7 may be implemented in hardware, e.g., CPU (Central Processing Unit), DSP (Digital Signal Processor), and FPGA (Field Programmable Gate Array).

[Second Embodiment]

Figure 2:
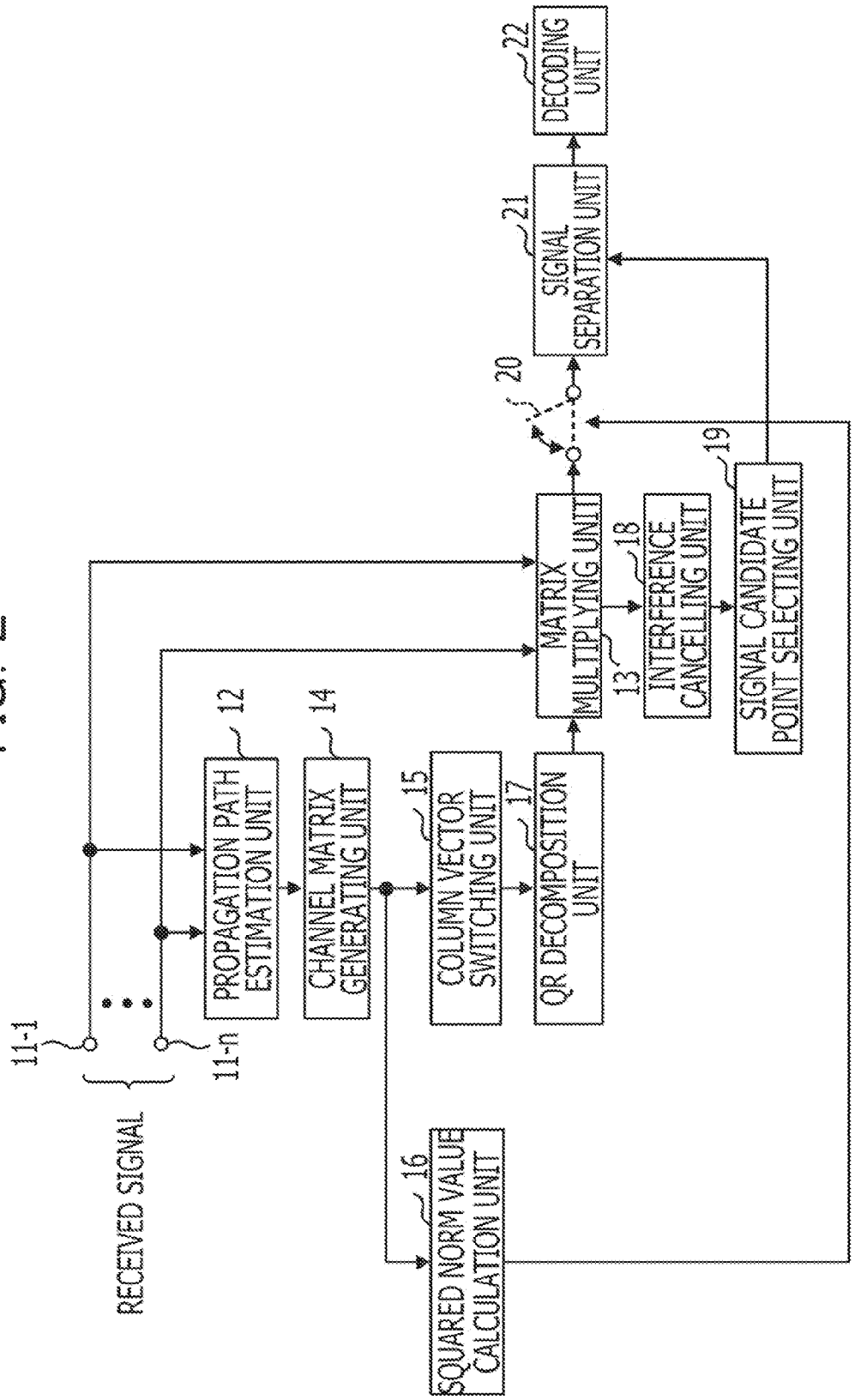
FIG. 2 is a configuration diagram of a second embodiment of the MIMO signal separation device.

FIG. 2 is a configuration diagram of a second embodiment of the MIMO signal separation device. The MIMO signal separation device illustrates processing of a baseband in a receiver, and QRM-MLD is assumed to be used for signal separation. The function illustrated in the FIG. 1 including the column switching unit 2, the QR decomposition layering unit 3, the interference signal cancelling unit 5, the signal candidate point selecting unit 6, and the signal separation unit 7 may be implemented in hardware, e.g., CPU (Central Processing Unit), DSP (Digital Signal Processor), and FPGA (Field Programmable Gate Array).

In FIG. 2, the received signals received by n pieces of antennas are input into terminals 11-1 to 11-$n$ and are then provided to a propagation path estimation unit 12 and a matrix multiplying unit 13. For example, by detecting a known pilot signal superposed on a transmitted signal from the received signal of an n-system, the propagation path estimation unit 12 estimates and provides a propagation path characteristic to a channel matrix generating unit 14. The channel matrix generating unit 14 generates a channel matrix H based on an estimation result of the above-described propagation path characteristic and provides the channel matrix H to a column vector switching unit 15 and a squared norm value calculation unit 16. The channel matrix H may be expressed as the following formula (4).

$$H = [h_1 \ \ldots \ h_{N_t}] \quad (4)$$

$$= \begin{bmatrix} h_{1,1} & \ldots & h_{1,N_t} \\ \vdots & \ddots & \vdots \\ h_{N_r,1} & \ldots & h_{N_t,N_t} \end{bmatrix}$$

Here, $h_n$ indicates a channel vector that corresponds to an n-th transmitted signal, $N_t$ indicates the number of transmit antennas, and $N_r$ indicates the number of receive antennas.

The column vector switching unit 15, which corresponds to the column switching unit 2 illustrated in FIG. 1, switches the transmitted signal components (column vector) of the channel matrix H in such a way that the transmitted signal component is positioned in the left end of the matrix. If the channel matrix of a case where the n-th signal component is switched to be in the left end of the matrix is indicated as $H_n$ (n=1 to N), $H_n$ may be expressed as the following formula (5).

$$H_n = [h_n \ \ldots \ h_{N_1}] \quad (5)$$

The following formulas (6a), (6b), and (6c) express channel matrixes $H_1$, $H_2$, and $H_3$ in a case where three transmit antennas and three receive antennas are used.

$$H_1 = \begin{bmatrix} h_{1,1} & h_{1,2} & h_{1,3} \\ h_{2,1} & h_{2,2} & h_{2,3} \\ h_{3,1} & h_{3,2} & h_{3,3} \end{bmatrix} \quad (6a)$$

$$H_2 = \begin{bmatrix} h_{1,2} & h_{1,1} & h_{1,3} \\ h_{2,2} & h_{2,1} & h_{2,3} \\ h_{3,2} & h_{3,1} & h_{3,3} \end{bmatrix} \quad (6b)$$

$$H_3 = \begin{bmatrix} h_{1,3} & h_{1,2} & h_{1,1} \\ h_{2,3} & h_{2,2} & h_{2,1} \\ h_{3,3} & h_{3,2} & h_{3,1} \end{bmatrix} \quad (6c)$$

The channel matrix $H_n$ output from the column vector switching unit 15 is provided to a QR decomposition unit 17 and is subjected to the QR decomposition into a unitary matrix Q and an upper triangular matrix R. The QR decomposition of the channel matrix $H_n$ may be expressed as the following formula (7).

$$H_n = Q_n R_n \quad (7)$$

$$= Q_n \begin{bmatrix} r_{n,1,1} & \ldots & r_{n,1,N_t} \\ & \ddots & \vdots \\ 0 & & r_{n,N_t,N_t} \end{bmatrix}$$

The matrix multiplying unit 13 multiplies the received signal provided from the terminals 11-1 to 11-$n$ by a complex conjugate transposition (Hermite conjugate) of the unitary matrix Q generated by the QR decomposition, and the received signals are layered so that the transmitted signal component of the transmit antenna exists mainly in the first row. The QR decomposition unit 17 and the matrix multiplying unit 13 correspond to the QR decomposition layering unit 3. A received signal vector after layering $y_n$ may be expressed as the following formula (8).

$$y_n = \begin{bmatrix} r_{n,1,1} & \ldots & r_{n,1,N_t} \\ & \ddots & \vdots \\ 0 & & r_{n,N_t,N_t} \end{bmatrix} \begin{bmatrix} x_r \\ \vdots \\ x_{N_t} \end{bmatrix} + \Pi_R \quad (8)$$

Here, $x_n$ indicates a transmitted signal transmitted from the n-th transmit antenna, and $\Pi_n$ indicates a noise vector after unitary matrix multiplication.

The interference cancellation unit 18, which corresponds to the interference signal cancelling unit 5 illustrated in FIG. 1, uses the received signal vector after layering $y_n$ to cancel the interference component other than the transmitted signal component from the signal in the first row by using the signal other than the signal in the first row. To simplify the description, $N_t = N_r = 2$ is assumed. In this case, the received signal vectors after layering $y_1$ and $y_2$ may be expressed as the following formulas (9a) and (9b).

$$y_1 = \begin{bmatrix} r_{1,1,1} & r_{1,1,2} \\ 0 & r_{1,2,2} \end{bmatrix} \begin{bmatrix} x_1 \\ x_2 \end{bmatrix} + \Pi_1 \quad (9a)$$

$$y_2 = \begin{bmatrix} r_{2,1,1} & r_{2,1,2} \\ 0 & r_{2,2,2} \end{bmatrix} \begin{bmatrix} x_2 \\ x_1 \end{bmatrix} + \Pi_2 \quad (9b)$$

The interference cancellation unit 18 cancels the interference component by multiplying the signal in the last row of the received signal vectors after layering $y_1$ and $y_2$ by a weight $w_n$ and subtracting the multiplied value from the formula in the first row. The weight $w_n$ indicates an interference cancellation weight in a case where the n-th transmitted signal component is subtracted. If noise terms $\Pi_1$ and $\Pi_2$ are ignored, and the signals $\hat{x}_1$ and $\hat{x}_2$ after interference cancellation may be expressed as the following formulas (10a) and (10b).

$$\hat{x}_1 = r_{1,1,1} x_1 + (r_{1,1,2} - w_1 r_{1,2,2}) x_2 \quad (10a)$$

$$\hat{x}_2 = r_{2,1,1} x_2 + (r_{2,1,2} - w_2 r_{2,2,2}) x_1 \quad (10b)$$

Accordingly, the signals after interference cancellation become $\hat{x}_1 \approx r_{1,1,1} x_1$ and $\hat{x}_2 \approx r_{2,1,1} x_2$.

The weight $w_1$ and the weight $w_2$ in the formula (10a) and the formula (10b) are expressed below according to a Minimum Mean Square Error (MMSE) criterion. Here, $\sigma^2$ indicates a noise power.

$$w_1 = (r_{1,1,2} \times r_{1,2,2}) / [|r_{1,2,2}|^2 + \sigma^2]$$

$$w_2 = (r_{2,1,2} \times r_{2,2,2}) / [|r_{2,2,2}|^2 + \sigma^2]$$

Figure 3:
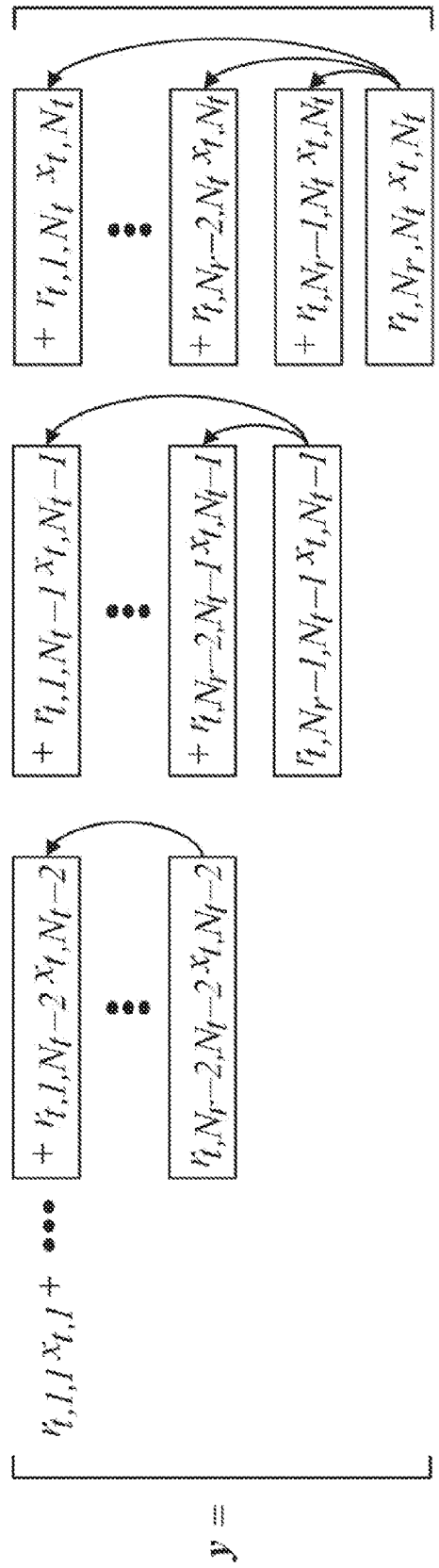
FIG. 3 is a diagram illustrating interference cancellation.

FIG. 3 illustrates interference cancellation in a case where the n-th transmitted signal candidate point is selected by a received signal number Nr and a transmitted signal number Nt.

The interference cancellation unit 18 weights each of the signals $r_{t,Nr,Nt} x_{t,Nt}$ in the last row and subtracts the weighted value from each of the signal $r_{t,Nr-1,Nt} x_{t,Nt}, r_{t,Nr-2,Nt} x_{t,Nt}, \ldots$, and $r_{t,1,Nt} x_{t,Nt}$ as the interference component.

The interference cancellation unit 18 weights each of the signal $r_{t,Nr-1,Nt-1} x_{t,Nt-1}$ in the second row from the bottom and subtracts the weighted value from each of the signal $r_{t,Nr-1,Nt} x_{t,Nt}, r_{t,Nr-2,Nt} x_{t,Nt}, \ldots$, and $r_{t,1,Nt-1} x_{t,Nt-1}$ as the interference component.

The interference cancellation unit 18 weights each of the signal $r_{t,Nr-2,Nt-2} x_{t,Nt-2}$ in the third row from the bottom and subtracts the weighted value from each of the signal $r_{t,Nr-1,Nt}x_{t,Nt}$, $r_{t,Nr-2,Nt}x_{t,Nt}$, ..., and $r_{t,1,Nt-2}x_{t,Nt-2}$ as the interference component.

Accordingly, the signal $r_{t,1,1}x_{t,1}$ with a large received diversity effect may be obtained in the left end of the first row. That is, the transmitted signal $x_{t,1}$ whose component is mainly in the left end of the first row has the large received diversity effect.

A signal candidate point selecting unit 19 corresponds to the signal candidate point selecting unit 6 illustrated in FIG. 1. On the assumption of $N_t=N_r=2$, the signal candidate point selecting unit 19 compares the signal $\hat{x}_1$ after interference cancellation with the large received diversity effect to a replica of the signal $x_1$ (64 replicas in a case of 64-QAM) to select a prescribed number m of replicas with a higher likelihood (m is smaller than 64 and smaller than the signal point number M in the M-algorithm) as a signal candidate point. Similarly, the signal candidate point selecting unit 19 compares the signal $\hat{x}_2$ with the large received diversity effect to the replica of the signal $x_2$ to select the prescribed number m of replicas as the signal candidate point. Accordingly, the signal candidate point number of the transmitted signal $\hat{x}_n$ may be reduced to the prescribed number m, and the signal candidate point of the selected transmitted signal $\hat{x}_n$ is provided to a signal separation unit 21.

As described above, even though the signals $x_1$ and $x_2$ in the first row have the interference component, the signals $x_1$ and $x_2$ may obtain a received diversity effect. For example, in the formula (3), the components of the transmitted signal $x_1$ concentrate mainly in the signal $r_{1,1} \times x_1$ in the first row without being divided into the last row and the middle row. The signal point number may be considerably reduced by cancelling the interference component of the signals $x_1$ and $x_2$ with the large received diversity effect.

On the other hand, the squared norm value calculation unit 16 calculates a squared norm value of each column vector of the channel matrix H generated by the channel matrix generating unit 14, and generates a selection signal that is used to select the received signal vector after layering $y_n$ of the channel matrix H in which a column vector with the smallest squared norm value is in the left end and a column vector with the largest squared norm value is in the right end. In this selection, since the signal with the largest received diversity effect is positioned in the right end of the received signal vector after layering $y_n$, the highest signal separation accuracy may be obtained if the signal separation unit 21 described below performs the signal separation by using the QRM-MLD.

According to the selection signal provided from the squared norm value calculating unit 16, a switch 20 selects, among a plurality of received signal vectors after layering $y_n$ output from the matrix multiplying unit 13, the received signal after layering $y_n$ of the channel matrix H in which a column vector with the smallest squared norm value is in the left end and a column vector with the largest squared norm value is in the right end, and provides the received signal after layering $y_n$ to the signal separation unit 21.

The signal separation unit 21, which corresponds to the signal separation unit 7 illustrated in FIG. 1, performs the signal separation by using the QRM-MLD, for example. That is, for example, if the received signal after layering $y_n$ is expressed as the formula (3) and the transmitted signals $x_1$, $x_2$, and $x_3$ are 64-QAM signals, the signal separation unit 21 reduces the signal candidate points by comparing the signal $r_{3,3} \times x_3$ in the last row where there is no interference component to the replica of m pieces of signal candidate points selected by the signal candidate point selecting unit 19 with respect to the signal $x_3$ to select M (m>M) pieces with a higher likelihood. After that, the signal separation unit 21 reduces the signal candidate points by comparing the replicas of m pieces of signal candidate points selected by the signal candidate point selecting unit 19 to the replica of M pieces of signal candidate points of the signal $x_3$ to select M pieces with a higher likelihood. Similarly, regarding the signal $r_{1,1} \times x_1$, the signal $r_{1,2} \times x_2$, and the signal $r_{1,3} \times x_3$ in the first row, the signal separation unit 21 selects a signal candidate point with a higher likelihood by comparing the replica of m pieces of the signal candidate points selected by the signal candidate point selecting unit 19 with respect to the signal $x_1$ to the replica of M pieces of signal candidate points of the signals $x_2$ and $x_1$. The transmitted signals that are separated and output by the signal separation unit 21 are provided to a decoding unit 22 and are then decoded (for example, 64-QAM decoding) and output.

As described above, according to the present embodiment, the operation in the signal separation unit 21 may be reduced because the signal candidate point number is reduced to m pieces of signal candidate points in the signal candidate point selecting unit 19 in a former stage of the signal separation unit 21.

[Third Embodiment]

Figure 4:
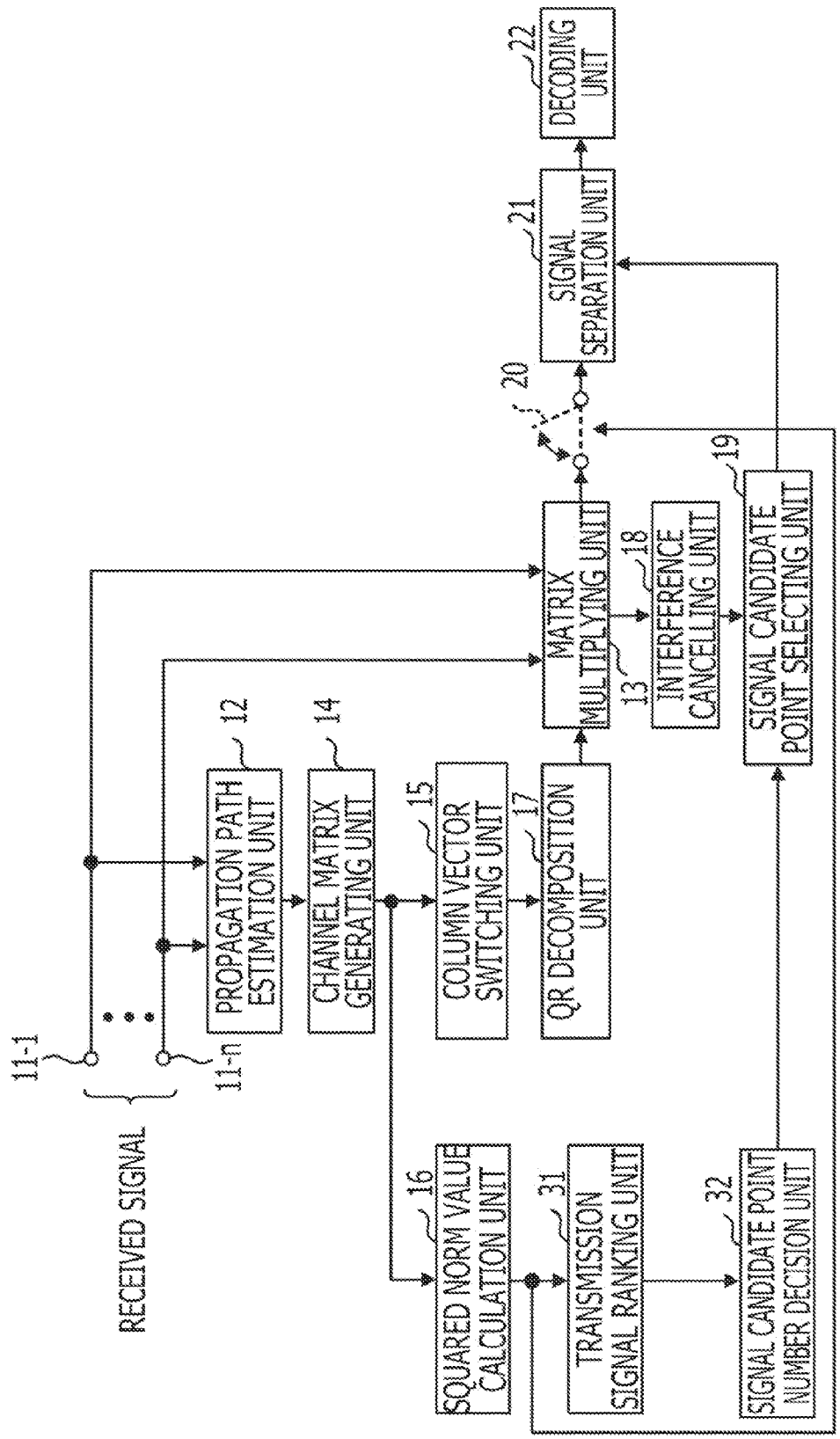
FIG. 4 is a configuration diagram of a third embodiment of the MIMO signal separation device.

FIG. 4 is a configuration diagram of a third embodiment of the MIMO signal separation device. The functions explained below may be implemented in hardware, e.g., CPU (Central Processing Unit), DSP (Digital Signal Processor), and FPGA (Field Programmable Gate Array).

In FIG. 4, parts equivalent to the parts in FIG. 2 are indicated with the same numerals. The received signals received by n pieces of antennas are input into the terminals 11-1 to 11-*n* and are then provided to the propagation path estimation unit 12 and the matrix multiplying unit 13. The propagation path estimation unit 12 estimates a propagation path characteristic based on the received signal of the n-system by a known method and provides the propagation path characteristic to the channel matrix generating unit 14. The channel matrix generating unit 14 generates the channel matrix H based on an estimation result of the above-described propagation path characteristic and provides the channel matrix H to the column vector switching unit 15 and the norm square calculation unit 16. The channel matrix H (4) may be expressed as the formula (4).

Here, $h_n$ indicates a channel vector that corresponds to the n-th transmitted signal, $N_t$ indicates the number of transmit antennas, and $N_r$ indicates the number of receive antennas.

The column vector switching unit 15 switches the transmitted signal components (column vector) of the channel matrix so that the transmitted signal component is in the left end of the matrix. If the channel matrix of a case where the n-th signal component is switched to be in the left end, $H_n$ (n=1 to $N_t$) may be expressed as the formula (5).

The formulas (6a), (6b), and (6c) express the channel matrixes $H_1$, $H_2$, and $H_3$ in a case where three transmit antennas and three receive antennas are used.

The channel matrix $H_n$ output from the column vector switching unit 15 is provided to the QR decomposition unit 17 and is then subjected to the QR decomposition. The QR decomposition of the channel matrix $H_r$, may be expressed as the formula (7).

The matrix multiplying unit 13 multiplies the received signal provided from the terminals 11-1 to 11-*n* by the complex conjugate transposition of the unitary matrix Q generated by the QR decomposition, so that the received signals are layered in such a way that the transmitted signal components exist mainly in the first row. The received signal vector after layering $y_n$ may be expressed as the formula (8).

Here, $x_n$ indicates a transmitted signal transmitted from the n-th transmit antenna, and $\Pi_n$ indicates a noise vector after unitary matrix multiplication.

The interference cancellation unit 18 uses the received signal vector after layering $y_n$ to cancel the interference component other than the transmitted signal component from the signal in the first row by using the signal other than the signal in the first row. To simplify the description, $N_t=N_r=2$ is assumed. In this case, the received signal vectors after layering $y_1$ and $y_2$ may be expressed as the formulas (9a) and (9b).

The interference cancellation unit 18 cancels the interference component by multiplying the signal in the last row of the received signal vectors after layering $y_1$ and $y_2$ by the weight $w_n$ and subtracting the multiplied value from the formula in the first row.

The weight $w_n$ indicates an interference cancellation weight in a case where the n-th transmitted signal component is subtracted. If the noise terms $\Pi_1$ and $\Pi_2$ are ignored, the signals $\hat{x}_1$ and $\hat{x}_2$ after interference cancellation are expressed as the formulas (10a) and (10b).

Therefore, signals after interference cancellation become a signal $\hat{x}_1 \approx r_{1,1} x_1$ and a signal $\hat{x}_2 \approx r_{2,1,1} x_2$. The signal candidate point selecting unit 19 compares the signal after interference cancellation $\hat{x}_1$ to a replica of the signal $x_1$ to select a prescribed number mi (i is 1, 2, 3, . . . etc.) of replicas with a high likelihood as a signal candidate point. Similarly, the signal candidate point selecting unit 19 compares the signal $\hat{x}_2$ and the replica of $x_2$ (64 replicas) to select the prescribed number mi with a high likelihood as a signal candidate point. Accordingly, the number of signal candidate points of the transmitted signal $\hat{x}_n$ may be reduced to the prescribed number m, each of the signal candidate points of the selected transmitted signal $\hat{x}_n$ may be provided to the signal separation unit 21. The prescribed number mi is provided from a signal candidate point number decision unit 32 described below.

Here, even though the signals $x_1$ and $x_2$ in the first row have the interference components, the received diversity effect may be obtained. For example, in the formula (3), the components of the transmitted signal $x_1$ concentrate mainly in the signal $r_{1,1} x_1$ in the first row without being divided into the last row and the middle row. Regarding the signals $x_1$ and $x_2$ having the received diversity effect, the signal points may be considerably reduced by cancelling the interference component.

On the other hand, the squared norm value calculation unit 16 calculates the squared norm value of the vector of the channel matrix H generated by the channel matrix generating unit 14, and generates a selection signal to select the received signal vector after layering $y_n$ of the channel matrix H in which the column vector with the smallest squared norm value is in the left end and the column vector with the largest squared norm value is in the right end thereof. In this selection, since the signal with the largest received diversity effect is positioned in the right end of the received signal vector after layering $y_n$, the highest signal separation accuracy may be obtained if the signal separation unit 21 described below performs the signal separation by using the QRM-MLD.

According to the selection signal provided from the squared norm value calculation unit 16, the switch 20 selects, among a plurality of received signal vectors $y_n$ output from the matrix multiplying unit 13, the received signal vector after layering $y_n$ of the channel matrix H in which the column vector with the smallest squared norm value is in the left end and the column vector with the largest squared norm value is in the right end, and provide the received signal vector after layering $y_n$ to the signal separation unit 21.

A transmitted signal ranking unit 31 is provided with the squared norm value of each column vector of the channel matrix H from the squared norm value calculation unit 16. The transmitted signal ranking unit 31 ranks the transmitted signal, which corresponds to the column vector with a large squared norm value, in a higher rank, and ranks the transmitted signal, which corresponds to the column vector with a small squared norm value, in a lower rank.

The number of selection candidate points is previously set to the signal candidate point number decision unit 32 according to a ranking. A smaller number of selection candidate points are selected for a higher rank, and a larger number of selection candidate points are selected for a lower rank. For example, a selection candidate point number m1 (for example, m1=10) is selected for the first rank, a selection candidate point number m2 (for example, m2=20) is selected for the second rank, a selection candidate point number m3 (for example, m3=30) is selected for the third rank, and a selection candidate point number m4 (for example, m4=40) is selected for the fourth rank. The selection candidate point number mi of the signal selected by the signal candidate point number decision unit 32 is provided to the signal candidate point selecting unit 19.

The signal separation unit 21 performs the signal separation by using the QRM-MLD, for example.

That is, for example, if the received signal vector after layering $y_r$, is expressed as the formula (3) and the transmitted signals $x_1$, $x_2$, and $x_3$ are 64-QAM signals, the signal separation unit 21 reduces the signal candidate points by comparing the signal $r_{3,3} \times x_3$ in the last row where there is no interference component to the replicas of m1, m2, etc. pieces of signal candidate points selected by the signal candidate point selecting unit 19 with respect to the signal $x_3$ to select M (m1>M) pieces of signal candidate points with a higher likelihood.

After that, the signal separation unit 21 reduces the signal candidate points by comparing the replicas of m pieces of signal candidate points and the replicas of M pieces of signal candidate points of the signal $x_3$ selected by the signal candidate point selecting unit 19 to select M pieces with a higher likelihood.

Similarly, regarding the signals $r_{1,1} \times x_1$ and the signal $r_{1,2} \times x_2$, $r_{1,3} \times x_3$ in the first row and the signal $x_1$, the signal separation unit 21 compares the signal $r_{1,1} \times x_1$ and the signal $r_{1,2} \times x_2$ in the first row, the signal separation unit 21 compares m pieces of the replicas of signal candidate points selected by the signal candidate selecting unit 19 to M pieces of the replicas of signal candidate points of the signals $x_2$ and $x_1$ to select the signal candidate point with a higher likelihood.

After the transmitted signals are separated and output by the signal separation unit 21, the transmitted signals are decoded (for example, 64-QAM decoding) and output by the decoding unit 22.

As described above, according to the present embodiment, since the number of signal candidate points is reduced to the signal candidate point number mi by the signal candidate point selecting unit 19 in a former stage of the signal separation unit 21, the operation in the signal separation unit 21 may be reduced. Moreover, an appropriate selection candidate point number mi may be set according to the ranking.

[Deformed Example]

Figure 5:
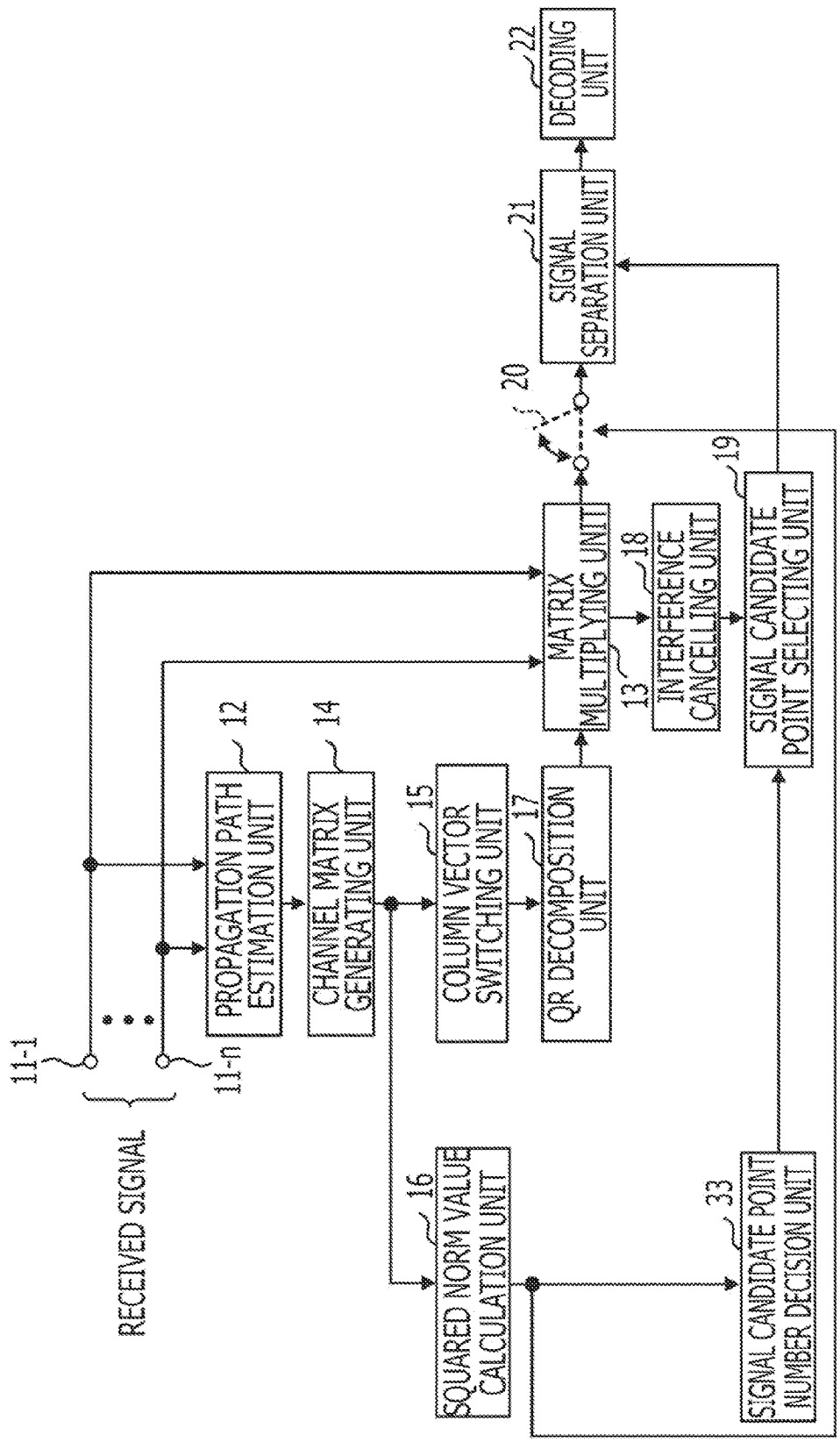
FIG. 5 is a configuration diagram of a deformed example of the third embodiment of the MIMO signal separation device.

FIG. 5 is a configuration diagram of a deformed example of the third embodiment of the MIMO signal separation device. The functions explained below may be implemented in hardware, e.g., CPU (Central Processing Unit), DSP (Digital Signal Processor), and FPGA (Field Programmable Gate Array).

In FIG. 5, parts equivalent to the parts in FIG. 4 are indicated with the same numerals. In FIG. 5, instead of the transmitted signal ranking unit 31 and the signal candidate point number decision unit 32, a signal candidate point number decision unit 33 is provided.

The signal candidate point number decision unit 33 is provided with a squared norm value of each column vector of the channel matrix H from the squared norm value calculation unit 16. The signal candidate point number decision unit 33 assigns the squared norm value to a prescribed function to calculate a selection candidate point number (an integral number). The above-described function has a smaller selection candidate point number if the squared norm value is larger and has a larger selection candidate point number if the squared norm value is smaller. The selection candidate point number calculated by the signal candidate point number decision unit 33 is provided to the signal candidate point selecting unit 19.

[Fourth Embodiment]

Figure 6:
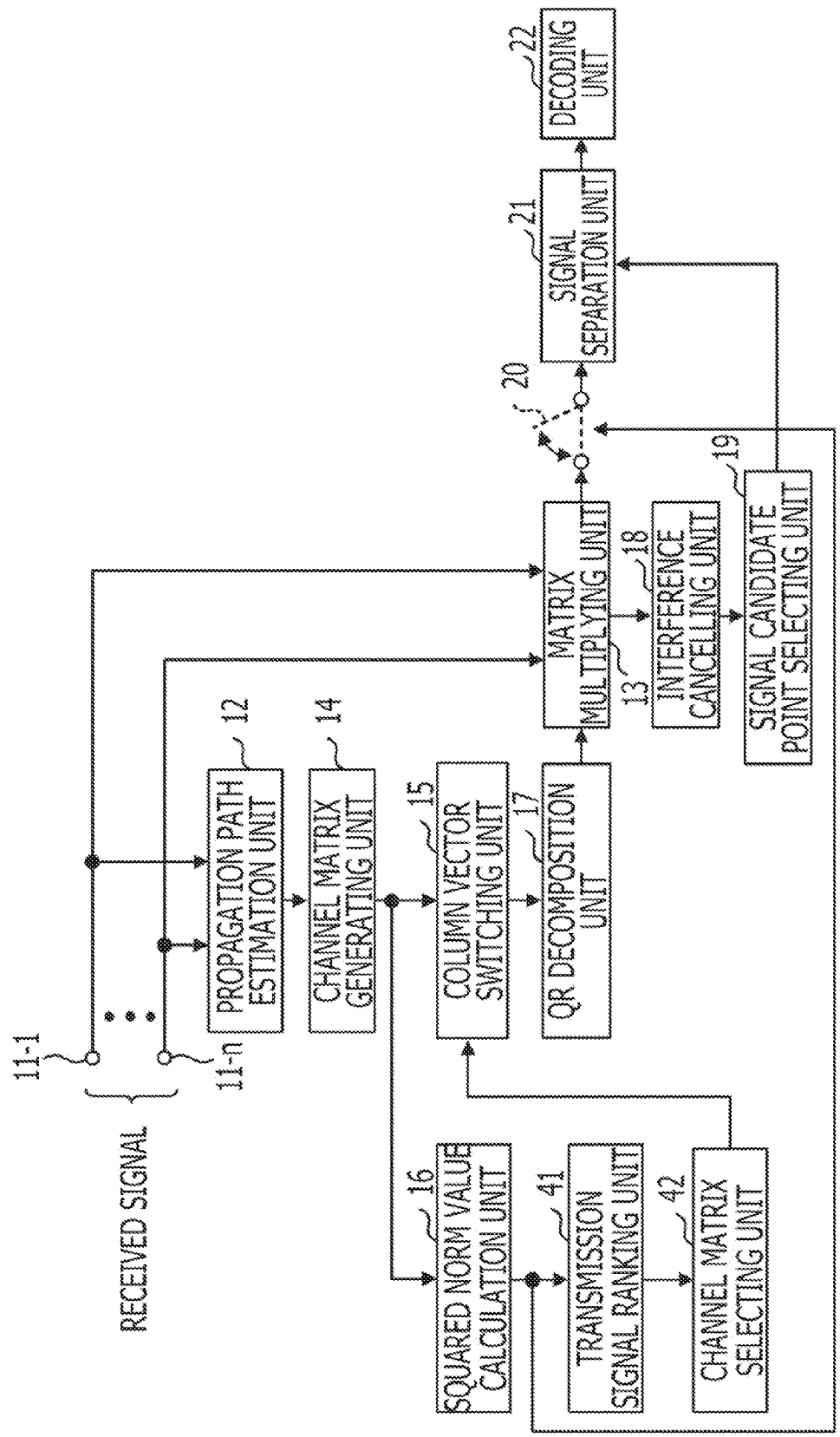
FIG. 6 is a configuration diagram of a fourth embodiment of the MIMO signal separation device.

FIG. 6 is a configuration diagram of a fourth embodiment of the MIMO signal separation device. The functions explained below may be implemented in hardware, e.g., CPU (Central Processing Unit), DSP (Digital Signal Processor), and FPGA (Field Programmable Gate Array).

In FIG. 6, parts equivalent to the parts in FIG. 2 are indicated with the same numerals. The received signals received by n pieces of antennas are input into the terminals 11-1 to 11-n and provided to the propagation path estimation unit 12 and the matrix multiplying unit 13. The propagation path estimation unit 12 estimates a propagation characteristic by a known method based on the received signal of the n-system and provides the propagation path characteristic to the channel matrix generating unit 14. The channel matrix generating unit 14 generates the channel matrix H based on the estimation result of the above-described propagation characteristic and provides the channel matrix H to the column vector switching unit 15 and the squared norm value calculation unit 16. The channel matrix H may be expressed as the formula (4).

In this case, $h_n$ indicates a channel vector that corresponds to the n-th transmitted signal, $N_t$ indicates the number of transmit antennas, and $N_r$ indicates the number of receive antennas.

The column vector switching unit 15 switches the transmitted signal component (column vector) of the channel matrix in such a way that the transmitted signal component is in the left end of the matrix. If the channel matrix of a case where the n-th signal component is switched to be in the left end of the matrix is indicated as $H_n$ (n=1 to N), $H_n$ may be expressed as the formula (5).

The formulas (6a), (6b), and (6c) express the channel matrixes $H_1$, $H_2$, and $H_3$ in a case where three transmit antennas and three receive antennas are used.

The channel matrix $H_n$ output from the column vector switching unit 15 is provided to the QR decomposition unit 17 and is subjected to the QR decomposition. The QR decomposition of the channel matrix $H_n$ may be expressed as the formula (7).

The matrix multiplying unit 13 multiplies the received signal provided from the terminals 11-a to 11-n by the complex conjugate transposition of the unitary matrix generated by the QR decomposition, and layers the received signal so that the transmitted signal component exists mainly in the first row. The received signal vector after layering $y_n$ may be expressed as the formula (8).

Here, $x_n$ indicates a transmitted signal transmitted from the n-th transmit antenna, and $\Pi_n$ indicates a noise vector after unitary matrix multiplication.

The interference cancellation unit 18 uses the received signal vector after layering $y_n$ to cancel the interference component other than the transmitted signal component from the signal in the first row by using the signal other than the signal in the first row. To simplify the description, $N_t=N_r=2$ is assumed. In this case, the received signal vectors after layering $y_1$ and $y_2$ may be expressed as the formulas (9a) and (9b).

The interference cancellation unit 18 cancels the interference component by multiplying the weight $w_n$ by the signal in the last row of the received signal vectors after layering $y_1$ and $y_2$. The weight $w_n$ indicates an interference cancellation weight in a case where the n-th transmitted signal component is subtracted. If the noise terms $\Pi_1$ and $\Pi_2$ are ignored, the signals $\hat{x}_1$ and $\hat{x}_2$ after interference cancellation are expressed as formulas (10a) and (10b).

Accordingly, the signals after interference cancellation become $\hat{x}_1 \approx r_{1,1,1} x_1$ and $\hat{x}_2 r_{2,1,1} x_2$. The signal candidate point selecting unit 19 compares the signal $\hat{x}_1$ after interference cancellation and the replicas (64 replicas in a case of 64-QAM) of the signal $x_1$ to select the prescribed number m of replicas with a higher likelihood. Similarly, the signal candidate point selecting unit 19 compares the signal $\hat{x}_2$ to the replicas (64 replicas) of the signal $x_2$ to select the prescribed number m of replicas with a higher likelihood. Accordingly, the number of signal candidate points of the transmitted signal $\hat{x}_n$ may be reduced to the prescribed number m, so that the signal candidate point of the selected $\hat{x}_n$ is provided to the signal separation unit 21.

In this case, even though the signal $x_1$ and $x_2$ in the first row have the interference component, the received diversity effect may be obtained. For example, in the formula (3), the components of the transmitted signal $x_1$ concentrate mainly in the signal $r_{1,1} \times x_1$ in the first row without being divided into the last row and the middle row. Regarding the signals $x_1$ and $x_2$ having the received diversity effect, the signal points may be considerably reduced by cancelling the interference component.

On the other hand, the squared norm value calculation unit 16 calculates the squared norm value of the column vector of the channel matrix H generated by the channel matrix generating unit 14, and generates a selection signal that selects the received signal vector after layering $y_n$ of the channel matrix H in which the column vector with the smallest squared norm value is in the left end and in which the column vector with the largest squared norm value is in the right end. In this selection, since the signal with the largest received diversity effect is positioned in the left end of the received signal vector after layering $y_n$, the highest signal separation accuracy may be obtained if the signal separation unit 21 described below performs the signal separation by using the QRM-MLD.

According to the selection signal provided from the squared norm value calculation unit 16, the switch 20 selects, among a plurality of received signal vectors after layering $y_n$ output from the matrix multiplying unit 13, the received signal vector after layering $y_n$ of the channel matrix H in which the column vector with the smallest squared norm value is in the left end and the column vector with the largest squared norm value is in the right end, and provides the received signal vector after layering $y_n$ to the signal separation unit 21.

A transmitted signal ranking unit 41 is provided with the squared norm value of the column vector of the channel matrix H from the norm square calculation unit 16. The transmitted signal ranking unit 41 ranks a transmitted signal, which corresponds to a column vector with a large squared norm value, in a higher rank, and ranks the transmitted signal that corresponds to the column vector whose squared norm value is small in a lower rank.

A channel matrix selecting unit 42 deletes the channel matrix $H_n$ in which the column vector whose rank is equal to or lower than a prescribed rank (for example, the third rank or the fourth rank) provided by the transmitted signal ranking unit 41 is positioned in the left end, generates a selection instruction signal that selects mainly the channel matrix $H_n$ in which the column vector whose rank is equal to or higher than the prescribed rank (for example, the first rank or the second rank) is positioned in the right end, and provides the selection instruction signal to the column vector switching unit 15.

Accordingly, the column vector switching unit 15 provides mainly the channel matrix $H_n$ in which the column vector whose rank is equal to or higher than the prescribed rank (for example, the first rank or the second rank) to the QR decomposition unit 17, so that the number of the received signal vectors that perform the QR decomposition of the QR decomposition unit 17, that is, the operation amount is reduced.

The signal separation unit 21 performs signal separation by using the QRM-MLD, for example. That is, for example, if the received signal vector after layering $y_n$ is expressed as the formula (3) and the transmitted signals $x_1$, $x_2$, and $x_3$ are 64-QAM signals, the signal separation unit 21 reduces the signal candidate points by comparing the signal $r_{3,3} \times x_3$ in the last row where there is no interference component to the replica of m pieces of signal candidate points selected by the signal candidate point selecting unit 19 to select M (m>M) pieces with a higher likelihood.

After that, the signal separation unit 21 reduces the signal candidate points by comparing the replica of m pieces of signal candidates selected by the signal candidate point selecting unit 19 to the replica of M pieces of signal candidate points to select M pieces with a higher likelihood.

Similarly, the signal separation unit 21 compares the replica of m pieces of signal candidate points selected by the signal candidate point selecting unit 19 to the replica of M pieces of signal candidate points of the signals $x_2$ and $x_1$ to select a signal candidate point with a higher likelihood.

The transmitted signal separated and output by the signal separation unit 21 is provided to the decoding unit 22 and is then decoded (for example, 64-QAM decoding) and output.

[Deformed Example ]

Figure 7:
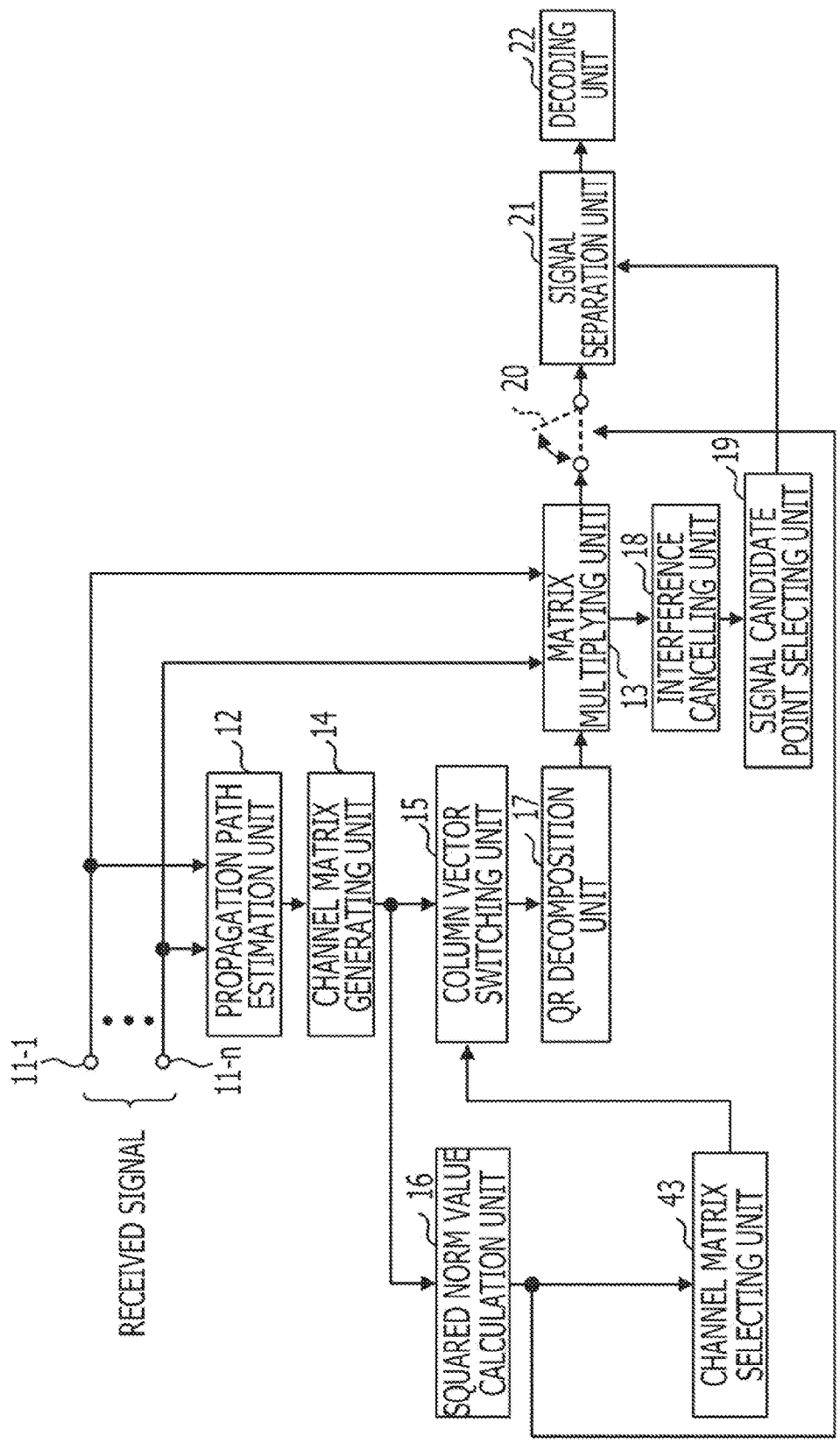
FIG. 7 is a configuration diagram of a deformed example of the fourth embodiment of the MIMO signal separation device.

FIG. 7 is a configuration diagram of a deformed example of the fourth embodiment of the MIMO signal separation device. The functions explained below may be implemented in hardware, e.g., CPU (Central Processing Unit), DSP (Digital Signal Processor), and FPGA (Field Programmable Gate Array).

In FIG. 7, parts equivalent to the parts in FIG. 6 are indicated with the same numerals. In FIG. 7, instead of the transmitted signal ranking unit 41 and a channel matrix selecting unit 42, a channel matrix selecting unit 43 is provided.

The channel matrix selecting unit 43 is provided with the squared norm value of the column vector of the channel matrix H from the squared norm value calculation unit 16. The channel matrix selecting unit 43 deletes the channel matrix $H_n$ in which the column vector whose squared norm value is equal to or less than a threshold value (for example, 1) is positioned in the left end, generates a selection instruction signal that selects mainly the channel matrix $H_n$ in which the column vector whose squared norm value is equal to or more than the threshold value is positioned in the left end, and provides the selection instruction signal to the column vector switching unit 15.

Accordingly, the column vector switching unit 15 provides the QR decomposition unit 17 mainly with the channel matrix $H_n$ in which the column vector whose squared norm value is less than a threshold value is positioned in the left end, so that the number of the received signal vectors performing the QR decomposition, that is, the operation amount, of the QR decomposition unit 17 is reduced.

[Fifth Embodiment]

Figure 8:
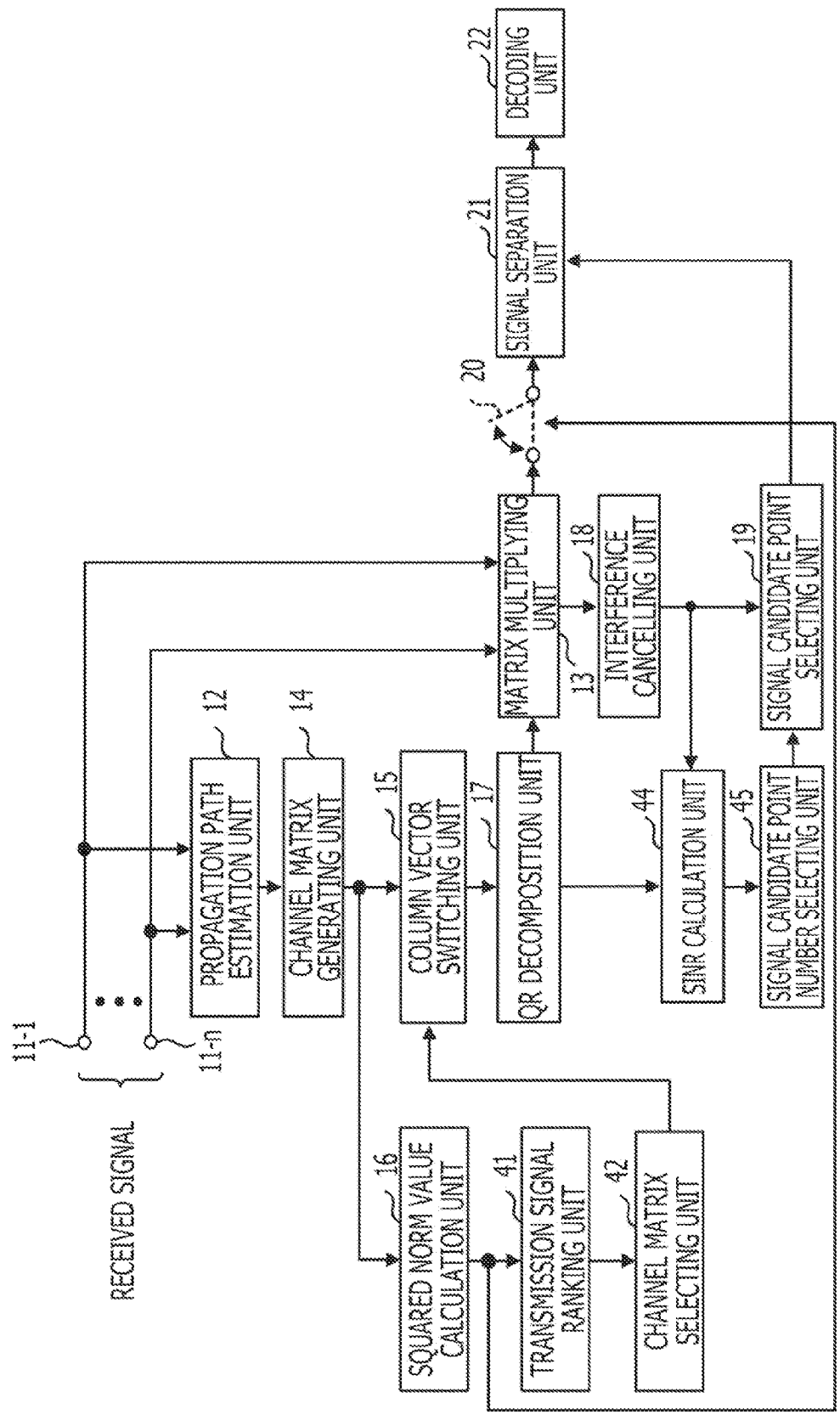
FIG. 8 is a configuration diagram of a fifth embodiment of the MIMO signal separation device.

FIG. 8 is a configuration diagram of a fifth embodiment of the MIMO signal separation device. The functions explained below may be implemented in hardware, e.g., CPU (Central Processing Unit), DSP (Digital Signal Processor), and FPGA (Field Programmable Gate Array).

In FIG. 8, parts equivalent to the parts in FIG. 6 are indicated with the same numerals. The received signals received by n pieces of antennas are input into the terminals 11-1 to 11-n and are provided to the propagation path estimation unit 12 and the matrix multiplying unit 13. The propagation path estimation unit 12 estimates and provides a propagation path characteristic to the channel matrix generating unit 14. The channel matrix generating unit 14 generates the channel matrix H based on the estimation result of the above-described propagation path characteristic and provides the channel matrix H to the column vector switching unit 15 and the norm square calculation unit 16. The channel matrix H may be expressed as the formula (4).

Here, $h_n$ indicates a channel vector that corresponds to the n-th transmitted signal, $N_t$ indicates the number of transmit antennas, and $N_r$ indicates the number of receive antennas.

The column vector switching unit 15 switches the transmitted signal components (column vector) of the channel matrix so that the transmitted signal component is in the left end of the matrix. If the channel matrix of a case where the n-th signal component is switched to be in the left end of the matrix is indicated as $H_n$ (n=1 to $N_t$), $H_n$ may be expressed as the formula (5).

The formulas (6a), (6b), and (6c) express the channel matrixes $H_1$, $H_2$, and $H_3$ in a case where three transmit antennas and three receive antennas are used.

The channel matrix $H_n$ output from the column vector switching unit 15 is provided to the QR decomposition unit 17 and is subjected to the QR decomposition. The QR decomposition of the channel matrix $H_n$ may be expressed as the formula (7).

The matrix multiplying unit 13 multiplies the complex conjugate transposition of the unitary matrix Q generated by the QR decomposition by the received signal provided from the terminals 11-1 to 11-n, and layers the received signals in such a way that the transmitted signal component exists mainly in the first row. The received signal vector after layering $y_n$ may be expressed as the formula (8).

Here, $x_n$ indicates a transmitted signal transmitted from the n-th transmit antenna, and $\Pi_n$ indicates a noise vector after unitary matrix multiplication.

The interference cancellation unit 18 uses the received signal vector after layering $y_r$, to cancel the interference component other than the transmitted signal component from the signal in the first row by using the signal other than the signal in the first row. To simplify the description, $N_t=N_r=2$ is assumed. In this case, the received signal vectors after layering $y_1$ and $y_2$ may be expressed as the formulas (9a) and (9b).

The radio communication between the mobile station device 300-1 and the base station device 100 uses the frequency band FB1. The radio communication of the downlink between the relay device 200-1 and the base station device 100 and the radio communication of the downlink between the relay device 200-2 and the base station device 100 use the frequency band FB1.

The interference cancellation unit 18 cancels the interference component by multiplying the weight $w_n$ by the signal in the last row of the received signal vector after layering $y_1$ and $y_2$ and subtracting the multiplied value from the formula in the first row.

The weight $w_n$ indicates an interference cancellation weight in a case where the n-th transmitted signal component is subtracted. If the noise terms $\Pi_1$ and $\Pi_2$ are ignored, the signals after interference cancellation $\hat{x}_1$ and $\hat{x}_2$ are expressed as the formulas (10a) and (10b).

Accordingly, the signals after interference cancellation become $\hat{x}_1 \approx r_{1,1,1} x_1$ and $\hat{x}_2 \approx r_{2,1,1} x_2$.

The signal candidate point selecting unit 19 compares the signal $\hat{x}_1$ after interference cancellation to the replicas of the signal $x_1$ to select the prescribed number mi (i is 1, 2, 3, etc.) of replicas with a higher likelihood as a signal candidate point. Similarly, the signal candidate point selecting unit 19 compares the signal $\hat{x}_2$ to the replicas (64 replicas) of the signal $x_2$ to select mi pieces of replicas with a higher likelihood as a signal candidate point. Accordingly, the signal candidate point number of the transmitted signal $\hat{x}n$ may be reduced to the prescribed number m, and the signal candidate point of the selected transmitted signal $\hat{x}n$ is provided to the signal separation unit 21. The prescribed number mi is provided from the signal candidate point number selecting unit 54 described below.

In this case, even though the signals $x_1$ and $x_2$ in the first row have the interference component, the received diversity effect may be obtained. For example, in the formula (3), the components of the transmitted signal $x_1$ concentrate mainly in the signal $r_{1,1} \times x_1$ in the first row without being divided into the last row and the middle row. Regarding the signals $x_1$ and $x_2$ having the received diversity effect, the signal points may be considerably reduced by cancelling the interference component.

On the other hand, the squared norm value calculation unit 16 calculates a squared norm value of the column vector of the channel matrix H generated by the channel matrix generating unit 14, and generates a selection signal used to select the received signal vector after layering $y_n$ of the channel matrix H in which the smallest squared norm value is in the left end and the largest squared norm value is in the right end of the matrix. In this selection, since the signal with the largest received diversity effect is positioned in the left end of the received signal vector after layering $y_n$, the first signal separation accuracy may be obtained if the signal separation unit 21 described below performs the signal separation by using the QRM-MLD.

According to the selection signal provided from the norm square calculation unit 16, the switch 20 selects, among a plurality of received signal vectors after layering $y_n$ output from the matrix multiplying unit 13, the received signal vector after layering $y_n$ of the channel matrix H in which the column vector with the smallest squared norm value is in the left end and the column vector with the largest squared norm value is in the right end, and provides the received signal after layering $y_n$ to the signal separation unit 21.

The transmitted signal ranking unit 41 is provided with the squared norm value of the column vector of the channel matrix H from the norm square calculation unit 16. The transmitted signal ranking unit 41 performs ranking in such a way that a transmitted signal that corresponds to a column vector with a large squared norm value is ranked in a higher rank, and a transmitted signal that corresponds to a column vector with a small squared norm value is ranked in a lower rank.

The channel matrix selecting unit 42 deletes the channel matrix $H_n$ in which the column vector whose ranking is equal to or lower than a prescribed value (for example, the third rank or the fourth rank) provided by the transmitted signal ranking unit 41 is positioned in the left end, generates a selection instruction signal that selects mainly the channel matrix $H_n$ in which the column vector whose ranking is equal to or higher than the prescribed value (for example, the first rank or the second rank), and provides the selection instruction signal to the column vector switching unit 15.

Accordingly, the column vector switching unit 15 provides mainly the channel matrix $H_n$ in which the column vector whose ranking is equal to or higher than the prescribed value (for example, the first or the second) is positioned in the left end, so that the number of received signal vectors performing the QR decomposition of the QR decomposition unit 17, that is, the operation amount is reduced.

An SINR calculation unit 44 calculates an SINR (Signal-to-Interference plus Noise power Ratio) of each signal by using the QR decomposition result output from the QR decomposition unit 17 and the signal after interference cancellation output from the interference cancellation unit 18. Each of $SINR_1$ and $SINR_2$ of the signals $\hat{x}_1$ and $\hat{x}_2$ are calculated by the following formulas (11a) and (11b), respectively.

$$SINR_1 = \frac{|r_{1,1,1}|^2}{|r_{1,1,2} - w_1 r_{1,2,2}|^2 + \sigma^2} \tag{11a}$$

$$SINR_2 = \frac{|r_{2,1,1}|^2}{|r_{2,1,2} - w_2 r_{2,2,2}|^2 + \sigma^2} \tag{11b}$$

With respect to the SINR value of each signal, a signal candidate point number selecting unit 45 decides a signal candidate point number of each transmitted signal by using the prescribed threshold value. For example, if the SINR is within the range from 0 to 10 dB, the selection candidate point number is 64 (meaning that candidate point selecting is not performed because the signal candidate point number of 64-QAM is 64). If the SINR is within the range from 10 to 20 dB, the selection candidate point number is 32. If the SINR is within the range of 20 to 30 dB, the selection candidate point number is 16. If the SINR exceeds 30, the selection candidate point number is 8. The selected selection candidate point number mi of the received signal is provided to the signal candidate point selecting unit 19.

The signal separation unit 21 performs the signal separation by using the QRM-MLD, for example. That is, for example, if the received signal vector after layering $y_n$ is expressed as the formula (3) and the transmitted signals $x_1$, $x_2$, and $x_3$ are 64-QAM signals, the signal separation unit 21 reduces the signal candidate points by comparing the signal $r_{3,3} \times x_3$ in the last row where there is no interference component to the replicas of mi pieces (mi≧M) of the signal candidate points selected by the signal candidate point selecting unit 19 with respect to the signal $x_3$ to select M pieces with a higher likelihood. After that, regarding the signals $r_{2,2} \times x_2$ and $r_{2,3} \times x_3$ in the middle row and the signal $x_2$, the signal separation unit 21 reduces the signal candidate points by comparing the replicas of m pieces of signal candidate points selected by the signal candidate point selecting unit 19 to the replicas of M pieces of signal candidate points of the signal $x_3$ to select M pieces of signal candidate points with a higher likelihood.

Similarly, regarding the signal $r_{1,1} \times x_1$, the signal $r_{1,2} \times x_2$, and the signal $r_{1,3} \times x_3$ in the first row and the signal $x_1$, the signal separation unit 21 compares the replicas of m pieces of signal candidate points selected by the signal candidate point selecting unit 19 to the replicas of M pieces of signal candidate points of the signals $x_2$ and $x_1$, and selects the signal candidate point with a higher likelihood.

The transmitted signals separated and output by the signal separation unit 21 are provided to the decoding unit 22 and are then decoded (for example, 64-QAM decoding) and output.

According to the present embodiment, the operation in the signal separation unit 21 may be reduced by previously reducing the signal candidate points by using a signal with a higher SINR. The present embodiment may have a configuration in which the transmitted signal ranking unit 41 and the channel matrix selecting unit 42 are deleted.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

The invention claimed is

1. A signal separation device used in a radio communication system in which a signal transmitted from a plurality of transmit antennas are received by a plurality of receive antennas, the signal separation device comprising:
a column switching unit configured to switch a column vector of a channel matrix, as obtained by estimating a propagation path characteristic between each of the plurality of transmit antennas to each of the plurality of receive antennas, so that a transmitted signal component of each of the plurality of transmit antennas is in a left end;
a QR decomposition layering unit configured to multiply a received signal of the plurality of receive antennas by an output from the column switching unit, and to output a received signal vector in which the received signal is layered so that a transmitted signal exists in a first row;
an interference cancellation unit configured to cancel an interference component from a signal in the first row in the layered received signal vector by using a signal other than the signal in the first row in a layered received signal vector;
a signal candidate point selecting unit configured to select a prescribed number of signal candidate points of the transmitted signal from among signals whose interference components have been cancelled; and
a signal separation unit configured to perform signal separation of the transmitted signal from the layered received signal vector output by the QR decomposition layering unit by using the selected signal candidate point of the transmitted signal.

2. The signal separation device according to claim 1, further comprising:
a norm square calculating unit configured to calculate a norm square of a column vector of the channel matrix; and
a received signal vector selecting unit configured to select a received signal vector in which a column vector with a smallest squared norm value output by the norm square calculating unit is in the left end of the channel matrix among the layered received signal vectors output by the QR decomposition layering unit and to provide received signal vector to the signal separation unit.

3. The signal separation device according to claim 2, further comprising a candidate point number decision unit configured to determine a signal candidate point number of the transmitted signal based on a squared norm value output from the norm square calculation unit, and
wherein the signal candidate point selecting unit selects a signal candidate point of the transmitted signal for the signal candidate point number of the transmitted signal decided by the candidate point number decision unit.

4. The signal separation device according to claim 2, further comprising a channel matrix selecting unit configured to generate a selection instruction signal that selects a channel matrix output from the column switching unit based on a squared norm value output of the norm square calculation unit, and
wherein the signal separation device provides a channel matrix output from the column switching unit to the QR decomposition layering unit according to the selection instruction signal.

5. The signal separation device according to claims 1, further comprising a candidate point number selecting unit configured to select a signal candidate point number of the transmitted signal
based on an output after the QR decomposition of the channel matrix output by the QR decomposition layering unit and the signals whose interference components are cancelled to be output by the interference signal cancelling unit, and
wherein the signal candidate point selecting unit selects the signal candidate point of the transmitted signal for mainly the signal candidate point number of transmitted signal selected by the candidate point number selecting unit.

6. A signal separating method used in a radio communication system in which a signal transmitted from a plurality of transmit antennas are received by a plurality of receive antennas, wherein the signal separating method comprising:
switching a column vector of a channel matrix, as obtained by estimating a propagation path characteristic between each of the plurality of transmit antennas and each of the plurality of receive antennas, so that a transmitted signal component of each of the plurality of transmit antennas is in a left end;
multiplying a received signal of a plurality of receive antennas by an output obtained by performing QR decomposition on a channel matrix output after the column vector is switched and outputting a received signal vector in which the received signal is layered so that the transmitted signal exists in a first row;
cancelling an interference component from a signal in the first row in the layered received signal vector by using signals from a signal in the first row to a signal other than the signal in the first row in the layered received signal vector;
selecting a prescribed number of signal candidate points of the transmitted signal from the signals whose interference components are cancelled; and
performing signal separation of the transmitted signal from the layered received signal vector by using the selected signal candidate points of the transmitted signal.

7. The signal separating method according to claim 6, further comprising:
calculating a norm square of a column vector of the channel matrix; and selecting a received signal vector in which a column vector with the smallest squared norm value is in the left end of the channel matrix from among the layered received signal vectors to perform signal separation of the transmitted signal.

8. The signal separating method according to claim 7, further comprising:

deciding a signal candidate point number of a transmitted signal based on the squared norm value; and selecting mainly a decided number of signal candidate points of the transmitted signal.

9. The signal separating method according to claim 8, further comprising:

ranking the transmitted signal based on the squared norm value; and selecting the signal candidate point number of the transmitted signal according to a ranking value.

10. The signal separating method according to claim 7, further comprising:

generating a selection instruction signal which selects a channel matrix to be output after the column vector is switched based on the squared norm value; and performing QR decomposition on the channel matrix to be output according to the selection instruction signal.

11. The signal separating method according to claim 10, further comprising:

selecting a signal candidate point number of the transmitted signal from an output obtained by performing the QR decomposition on the channel matrix and a signal whose interference component is cancelled; and selecting mainly the selected number of the signal candidate points of the transmitted signal.

12. The signal separating method according to claim 10, further comprising:

ranking the transmitted signal based on the squared norm value; and generating a selection instruction signal which selects a channel matrix in which a column vector whose ranking value is equal to or more than a prescribed value is positioned in a left end thereof.

13. The signal separating method according to claim 7, further comprising:

selecting a signal candidate point number of the transmitted signal from an output obtained by performing the QR decomposition on the channel matrix and a signal whose interference component is cancelled; and selecting mainly the selected number of the signal candidate points of the transmitted signal.

14. The signal separating method according to claim 6, further comprising:

selecting a signal candidate point number of the transmitted signal from an output obtained by performing the QR decomposition on the channel matrix and a signal whose interference component is cancelled; and selecting mainly the selected number of the signal candidate points of the transmitted signal.

15. The signal separating method according to claim 14, further comprising:

calculating a signal-to-interference plus noise power ratio of the transmitted signal based on an output of QR decomposition of the channel matrix and on a signal whose interference component is cancelled; and selecting a signal candidate point number of the transmitted signal according to the signal-to-interference plus noise power ratio of the transmitted signal.

* * * * *